(12) United States Patent
Choi et al.

(10) Patent No.: US 12,717,139 B2
(45) Date of Patent: Aug. 25, 2026

(54) OPTICAL SYSTEMS WITH SWITCHABLE LENSES FOR MITIGATING VARIATIONS IN AMBIENT BRIGHTNESS

(71) Applicant: Apple Inc., Cupertino, CA (US)

(72) Inventors: Hyungryul Choi, San Jose, CA (US); Guolin Peng, Sunnyvale, CA (US); Scott M. DeLapp, San Diego, CA (US); Vikrant Bhakta, Santa Clara, CA (US)

( * ) Notice: Subject to any disclaimer, the term of this patent is extended or adjusted under 35 U.S.C. 154(b) by 1201 days.

(21) Appl. No.: 17/477,408

(22) Filed: Sep. 16, 2021

(65) Prior Publication Data

US 2022/0004008 A1 Jan. 6, 2022

Related U.S. Application Data

(63) Continuation of application No. PCT/US2020/050884, filed on Sep. 15, 2020.

(60) Provisional application No. 62/904,439, filed on Sep. 23, 2019.

(51) Int. Cl.
*G02B 27/01* (2006.01)

(52) U.S. Cl.
CPC .. *G02B 27/0172* (2013.01); *G02B 2027/0118* (2013.01); *G02B 2027/0174* (2013.01)

(58) Field of Classification Search
CPC ... G02B 27/01–0189; G02B 2027/0105–0198; G03B 21/00–64
See application file for complete search history.

(56) References Cited

U.S. PATENT DOCUMENTS 10,859,832 B1 * 12/2020 Lanman .................. G06F 3/013
2010/0165297 A1 * 7/2010 Mizushima ............ G03B 21/14 353/30
2012/0062998 A1 * 3/2012 Schultz .............. G02B 27/0101 156/60
2017/0108697 A1 4/2017 El-Ghoroury et al.
2019/0025590 A1 1/2019 Haddick
2019/0146223 A1 * 5/2019 Li .......................... G02B 30/52 345/8
2019/0324274 A1 * 10/2019 Kalinowski ........... G02F 1/0126
2020/0371389 A1 * 11/2020 Geng ................ G02B 27/0172

FOREIGN PATENT DOCUMENTS

WO 2019111237 A1 6/2019

* cited by examiner

*Primary Examiner* — Christopher A Lamb, II
(74) *Attorney, Agent, or Firm* — Treyz Law Group, P.C.; Michael H. Lyons

(57) ABSTRACT

An electronic device may have an optical combiner, a spatial light modulator, and illumination optics. The modulator may produce image light for the combiner by modulating illumination light from the illumination optics. Adjustable optical components in the illumination optics may be controlled to adjust the illumination optics between first and second states. In the first state, the adjustable optical components may provide the illumination light to the modulator with a uniform intensity across the lateral area of the modulator. In the second state, the adjustable optical components may focus the illumination light within a subset of the lateral area. The subset of the lateral area may correspond with a bright object in the image light. The control circuitry may control the illumination optics to ensure that the bright object remains visible at an eye box even when the device is located in bright ambient lighting conditions.

17 Claims, 8 Drawing Sheets

OPTICAL SYSTEMS WITH SWITCHABLE LENSES FOR MITIGATING VARIATIONS IN AMBIENT BRIGHTNESS

This application is a continuation of international patent application No. PCT/US2020/050884, filed Sep. 15, 2020, which claims the benefit of U.S. provisional patent application No. 62/904,439, filed Sep. 23, 2019, which are hereby incorporated by reference herein in their entireties.

BACKGROUND

This relates generally to electronic devices and, more particularly, to electronic devices with optical components.

Electronic devices sometimes include optical components. For example, a wearable electronic device such as a head-mounted device may include a display for displaying an image close to a user's eyes.

To allow a head-mounted device to display a computer-generated image that is overlaid on top of real-world images, the head-mounted device may have a transparent display system. The system may have an optical combiner that merges real-world image light with computer-generated content.

It can be challenging to design devices such as these. If care is not taken, the components used in displaying content may be undesirably bulky and bright ambient lighting conditions can undesirably wash out or obscure computer-generated images overlaid with the real-world image light.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a display module that generates image light and an optical system that redirects the image light from the display module towards an eye box. The optical system may include a waveguide that forms an optical combiner to combine the image light with real world light.

The display module may include a reflective or transmissive spatial light modulator having a display panel. The display module may include illumination optics that illuminate the display panel with illumination light. The display panel may produce the image light by modulating the illumination light with corresponding images. The illumination optics may include light sources and adjustable optical components. The adjustable optical components may be controlled to adjust the illumination optics between at least first and second states. The adjustable optical components may include switchable lenses having adjustable optical powers and/or focal lengths, switchable diffractive gratings, etc. Control circuitry may use sensor data to determine when and how to adjust the illumination optics between the first and second states. A tint layer may be provided over the waveguide if desired.

In the first state, the adjustable optical components may provide the illumination light to the display panel with a uniform intensity (brightness) across the lateral area of the display panel. In the second state, the adjustable optical components may provide the illumination light to the display panel with a non-uniform intensity across the lateral area. For example, the adjustable optical components may focus the illumination light within a subset (region) of the lateral area so that the illumination light has increased intensity within the subset of the lateral area and decreased intensity outside of the subset of the lateral area. The subset of the lateral area may correspond with a bright object in the image light. The control circuitry may control the illumination optics to ensure that the bright object in the image light remains visible at the eye box even when the device is located in bright ambient lighting conditions.

DETAILED DESCRIPTION

Figure 1:
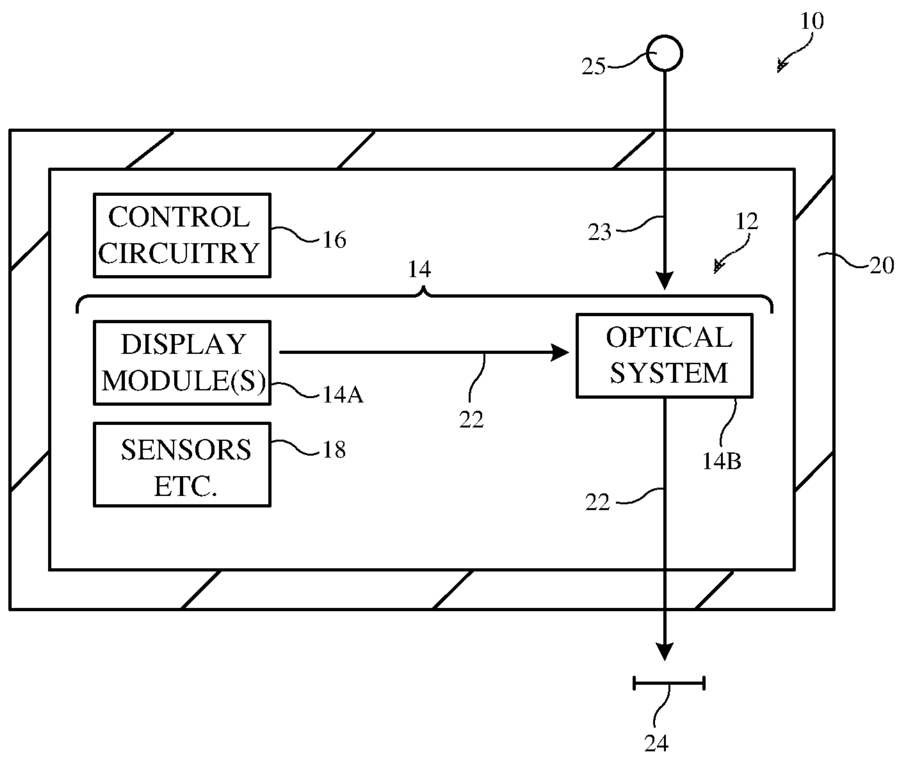
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (image light) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 14A may include reflective displays (e.g., liquid crystal on silicon (LCOS) displays, digital-micromirror device (DMD) displays, or other reflective spatial light modulators), transmissive displays (e.g., liquid crystal displays (LCDs) or other transmissive spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light 23 from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
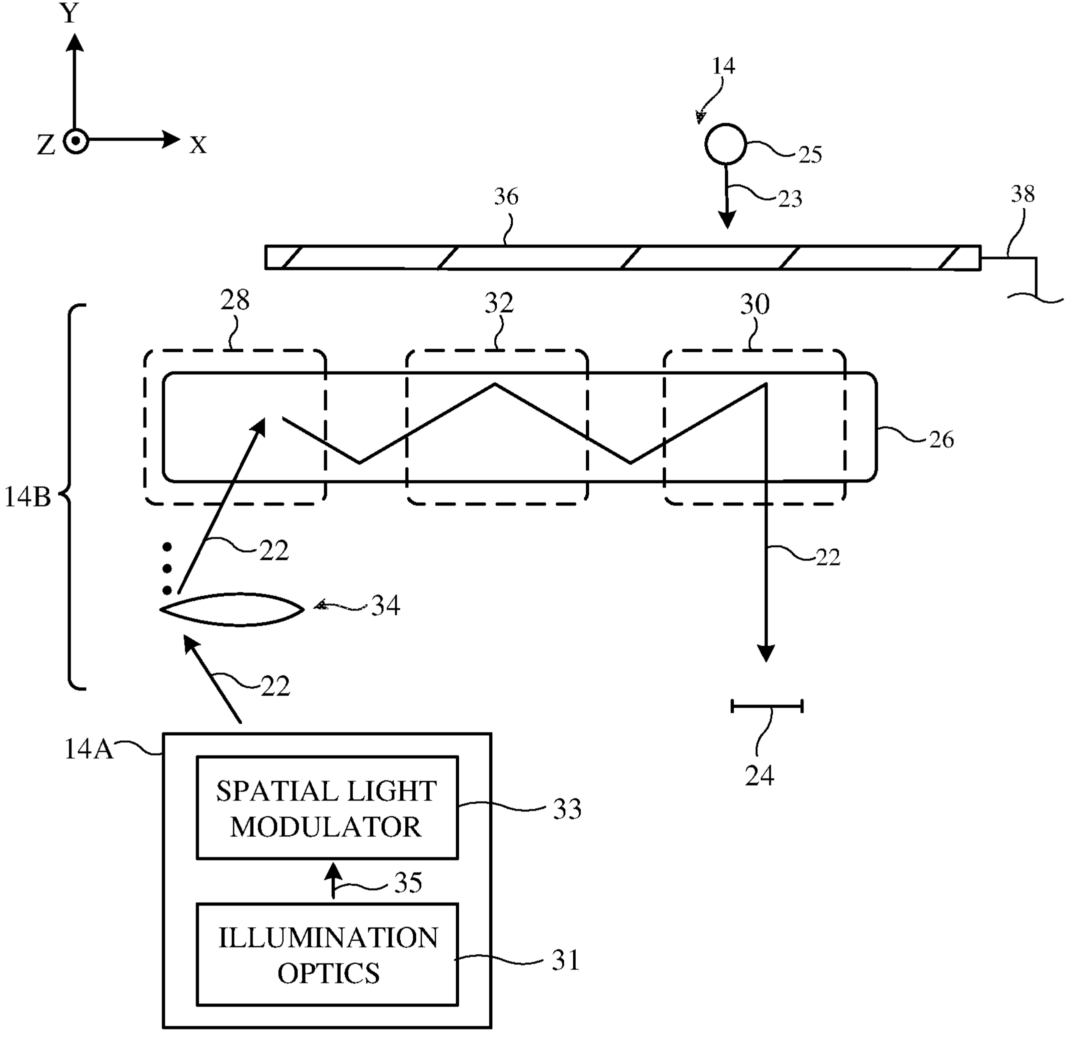
FIG. 2 is a top view of an illustrative optical system for a display having an optical combiner in accordance with some embodiments.

FIG. 2 is a top view of an illustrative display 14 that may be used in system 10 of FIG. 1. As shown in FIG. 2, near-eye display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34 (sometimes referred to herein as imaging optics 34 or collimating optics). Collimating optics 34 may include one or more lens elements that help direct image light 22 towards waveguide 26. If desired, display module 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module 14A may generate light 22 associated with image content to be displayed to eye box 24. In the example of FIG. 2, display module 14A includes illumination optics 31 and spatial light modulator 33. Illumination optics 31 may produce illumination light 35 (sometimes referred to herein as illumination 35) and may illuminate spatial light modulator 33 using illumination light 35. Spatial light modulator 33 may modulate illumination light 35 (e.g., using image data) to produce image light 22 (e.g., image light that includes an image as identified by the image data). Spatial light modulator 33 may be a reflective spatial light modulator (e.g., a DMD modulator, an LCOS modulator, etc.) or a transmissive spatial light modulator (e.g., an LCD modulator). This example is merely illustrative and, if desired, display module 14A may include an emissive display panel instead of a spatial light modulator. Light 22 may be collimated using collimating optics 34. Optical system 14B may be used to present light 22 output from display module 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module 14A (collimating optics 34) into waveguide 26, whereas output coupler 30 may be configured to couple image light 22 from within waveguide 26 to the exterior of waveguide 26 and towards eye box 24. For example, display module 14A may emit image light 22 in direction +Y towards optical system 14B. When image light 22 strikes input coupler 28, input coupler 28 may redirect image light 22 so that the image light propagates within waveguide 26 via total internal reflection towards output coupler 30 (e.g., in direction X). When image light 22 strikes output coupler 30, output coupler 30 may redirect image light 22 out of waveguide 26 towards eye box 24 (e.g., back along the Y-axis). In scenarios where cross-coupler 32 is formed at waveguide 26, cross-coupler 32 may redirect image light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, or other reflectors). In arrangements where couplers 28, 30, and 32 are based on holographic optics, couplers 28, 30, and 32 may include diffractive gratings (e.g., volume holograms, surface relief gratings, etc.).

In one suitable arrangement that is sometimes described herein as an example, output coupler 30 is formed from diffractive gratings or micromirrors embedded within waveguide 26 (e.g., volume holograms recorded on a grating medium stacked between transparent polymer waveguide substrates, an array of micromirrors embedded in a polymer layer interposed between transparent polymer waveguide substrates, etc.), whereas input coupler 28 is formed from a reflective or transmissive prism mounted to an exterior surface of waveguide 26 (e.g., an exterior surface defined by a waveguide substrate that contacts the grating medium or the polymer layer used to form output coupler 30).

In the arrangement of FIG. 2, waveguide 26 forms part of an optical combiner that overlays real world light 23 (sometimes referred to herein as world light 23) from real-world objects 25 (e.g., a real world scene) with image light 22 from display module 14A (e.g., with computer-generated objects in image light 22) so that both image light 22 and world light 23 are received at eye box 24 and seen by a user (e.g., output coupler 30 may transmit world light 23 without diffracting world light 23). In practice, when the user (device 10) is located in an environment with relatively bright ambient light conditions, world light 23 may be received at eye box 24 with a relatively high brightness (intensity).

In general, the brightness (intensity) of image light 22 may be limited (e.g., by hardware or power requirements for display 14). For example, sunlight may be at least 5-10 times as bright as the maximum brightness of image light 22. If care is not taken, when device 10 is located in an environment with relatively bright ambient light conditions (e.g., when device 10 is outside, under a bright overhead light, etc.), world light 23 may overpower the lower-intensity image light 22 at eye box 24 such that a user at eye box 24 may be unable to perceive objects in image light 22 (e.g., high intensity world light 23 may wash out or obscure objects in lower-intensity image light 22).

If desired, an optional tint layer 36 may be layered over waveguide 26. Tint layer 36 may help to reduce the brightness of world light 23 prior to world light 23 being transmitted through waveguide 26 (e.g., by five times or more). If desired, tint layer 36 may exhibit a transmission profile that varies as a function of wavelength so that world light 23 is tinted with a desired color before passing to eye box 24.

Tint layer 36 may be adjustable. For example, tint layer 36 may receive control signals over control path 38 that adjust the amount of world light 23 that tint layer 36 passes to waveguide 26. Tint layer 36 may, if desired, be adjusted to tune the color of the tint applied to world light 23 before world light 23 is passed to waveguide 26. Tint layer 36 may, for example, include an electrochromic layer, a photochromic layer, a guest host liquid crystal layer, etc. Tint layer 36 may be omitted if desired.

Figure 3:
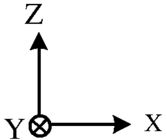
FIG. 3 is a front view showing how an illustrative image provided to an eye box may include an object that is washed out or obscured by bright ambient light conditions in accordance with some embodiments.
Figure 3:
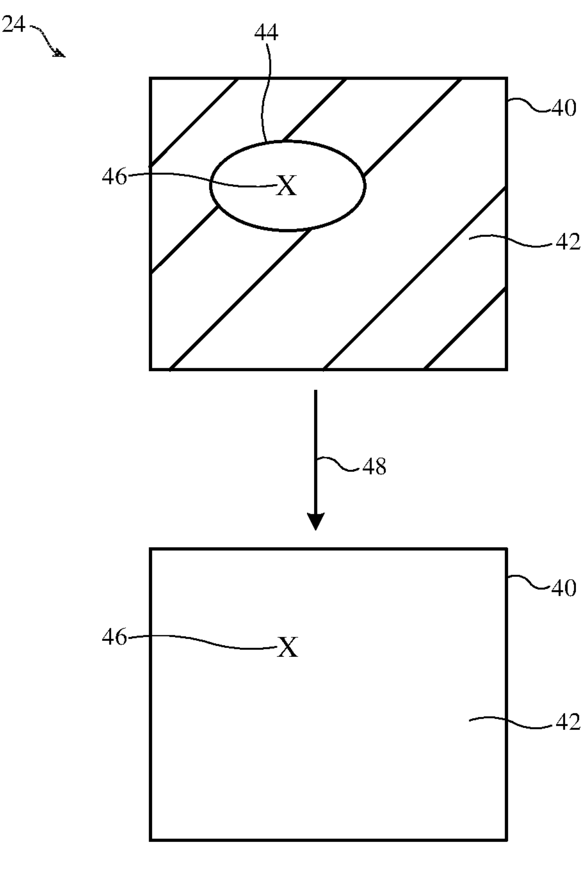

While tint layer 36 may help to prevent wash-out of objects in image light 22 by world light 23, tint layer 36 may not completely prevent wash-out, particularly in very bright ambient light conditions. FIG. 3 is a front-view of an exemplary image that may be provided to eye box 24, including both world light 23 and image light 22.

As shown in FIG. 3, when device 10 is in a relatively low ambient light environment, a first image 40 may be provided to eye box 24. Image 40 may include an object 44 at location 46 from image light 22. Object 44 may, for example, be a bright object such as a text message, alert, notification, etc. World light 23 may produce the remaining portions 42 of image 40. Because world light 23 has a relatively low intensity in this example, object 44 is clearly perceivable in image 40.

However, when device 10 moves to a relatively bright ambient light environment, as shown by arrow 48, the world light in region 42 may be so bright that object 44 at location 46 is washed out by the world light and is no longer perceivable to the user. In order to mitigate these issues, control circuitry 16 (FIG. 1) may control display module 14A to selectively focus more illumination light within a region of the spatial light modulator to help keep world light 23 from washing out objects in image light 22.

Figure 4:
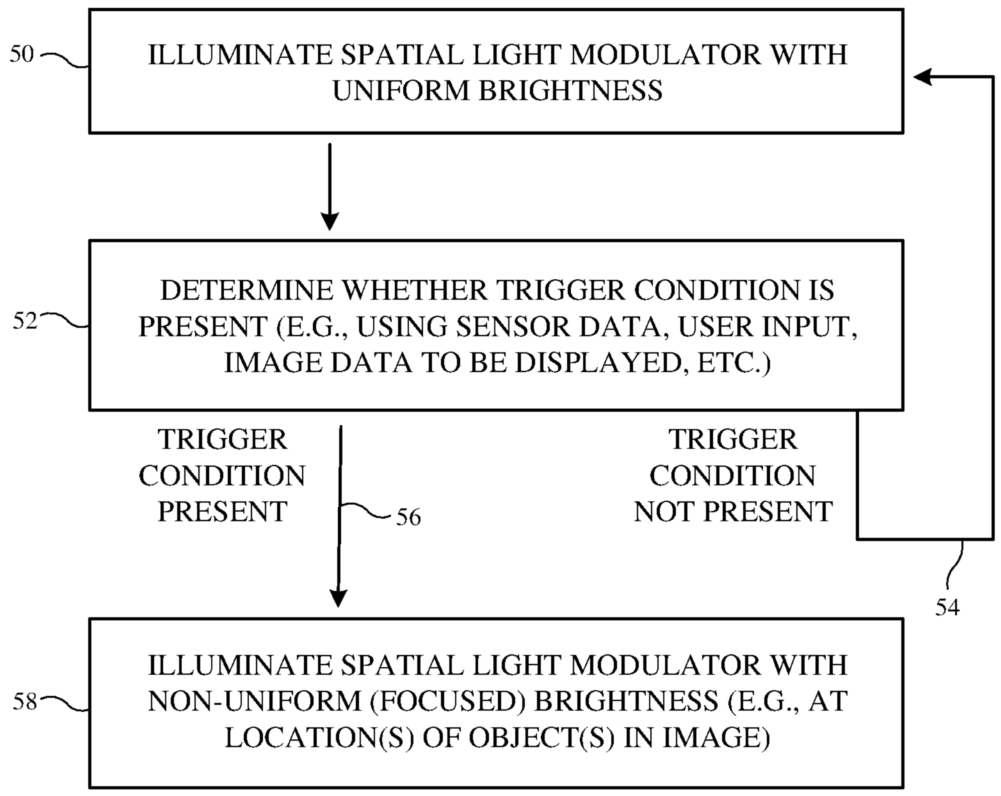
FIG. 4 is a flow chart of illustrative steps that may be performed in a display system to mitigate wash-out of objects in an image provided to an eye box in the presence of bright ambient light conditions in accordance with some embodiments.

FIG. 4 is a flow chart of illustrative steps that may be performed by system 10 to help mitigate wash-out of objects in image light 22 by world light 23. At step 50, control circuitry 16 may control illumination optics 31 of FIG. 2 to provide illumination light 35 to spatial light modulator 33 with a uniform brightness (intensity) across the (lateral) area of the spatial light modulator (e.g., across the entire image in image light 22). The brightness may be, for example, 500 nits, 400-600 nits, or other brightnesses, and may be uniform across the area of spatial light modulator 33. This may, for example, allow images in the image light 22 produced by spatial light modulator 33 to have an attractive and uniform appearance to the user at eye box 24.

At step 52, control circuitry 16 may determine (detect) whether a trigger condition is present that would require control circuitry 16 to focus more brightness on a particular region of the spatial light modulator (e.g., to prevent objects in image light 22 from being washed out by bright ambient light). For example, control circuitry 16 may use sensor data (e.g., ambient light sensor data, camera data, image sensor data, accelerometer data, etc.), user input (e.g., a control signal provided by a user to inform control circuitry 16 that the user is about to or has entered a bright ambient light environment), and/or the image data to be displayed in image light 22 to determine whether the trigger condition is met.

As an example, when the image data indicates that a bright object such as a notification, text message, alert (e.g., a traffic update), or other object is to be included in image light 22 (e.g., object 44 of FIG. 3) and ambient light sensor data indicates that device 10 is in a bright ambient light environment (e.g., when the ambient light sensor data exceeds a predetermined threshold value) or when the user provides input indicative of device 10 being located in a bright ambient light environment, control circuitry 16 may determine that the trigger condition is present. When the ambient light sensor data indicates that device 10 is located in a low ambient light environment or when no bright objects or alerts are to be included in image light 22, control circuitry 16 may determine that the trigger condition is not present, as an example. These examples are merely illustrative and, in general, any desired software and/or hardware-based trigger conditions may be used.

If the trigger condition is not present, processing may loop back to step 50, as shown by path 54, and the illumination optics may continue to illuminate the spatial light modulator with uniform brightness. However, if the trigger condition is present (detected), processing may proceed to step 58 as shown by path 56.

At step 58, control circuitry 16 may control illumination optics 31 to provide illumination light 35 to spatial light modulator 33 with a non-uniform brightness (e.g., illumination optics 31 may include adjustable or switchable optical components that can be adjusted to provide spatial light modulator 33 with illumination light of uniform or non-uniform brightness). For example, control circuitry 16 may control illumination optics 31 to focus more of the illumination light within a particular region of the spatial light modulator (e.g., a region corresponding to the location where a bright object in image light 22 will be displayed).

This may reduce the brightness provided to other portions of the spatial light modulator to instead boost the brightness of bright objects in the image light (e.g., by 1-5 times, 2-6 times, less than 100%, etc., relative to the brightness of those objects when the spatial light modulator is provided with uniform illumination). This may allow the bright objects to be more easily perceived by a user at eye box 24 instead of being washed out by bright world light 23 (e.g., without otherwise requiring more power consumption to provide the illumination light to the spatial light modulator). In this way, control circuitry 16 may adjust display module 14A between a first operating state at which illumination optics 31 provide spatial light modulator 33 with uniform illumination light and a second operating state at which illumination optics 31 provide spatial light modulator 33 with non-uniform (e.g., focused) illumination light to prevent wash-out of bright objects in image light 22 by bright ambient (world) light.

The steps of FIG. 4 are merely illustrative. If desired, processing may revert back to step 50 when the trigger condition dissipates (e.g., when the device returns to a low ambient light environment). Step 52 may be performed concurrently with step 50. Illumination optics 31 may focus illumination light 35 on multiple regions of spatial light modulator 33 concurrently if desired.

Figure 5:
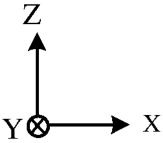
FIG. 5 is a front view showing how an illustrative image provided to an eye box may include an object that is still visible under bright ambient light conditions in accordance with some embodiments.
Figure 5:
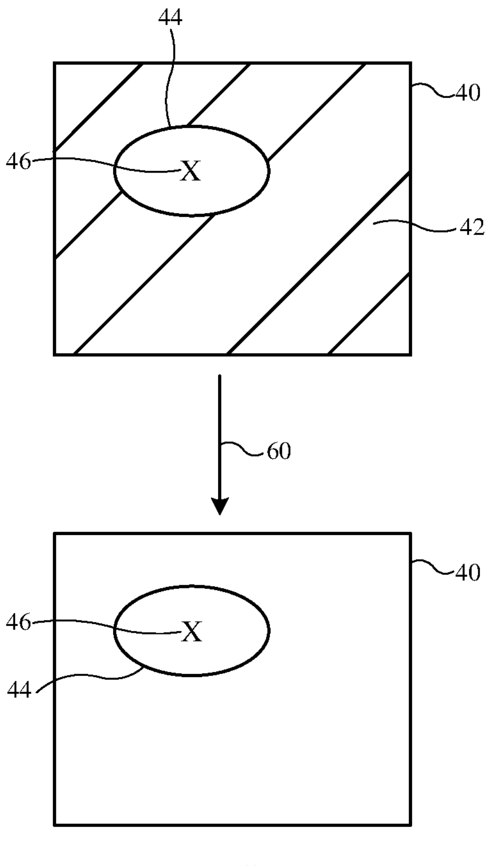

FIG. 5 is a front-view of an exemplary image that may be provided to eye box 24, including both world light 23 and image light 22, in an example where system 10 performs the steps of FIG. 4. As shown in FIG. 5, when device 10 is in a relatively low ambient light environment, first image 40 may be provided to eye box 24. Image 40 may include an object 44 at location 46 from image light 22. World light 23 may produce the remaining portions 42 of image 40. Because world light 23 has a relatively low intensity in this example, object 44 is clearly perceivable in image 40.

When device 10 moves to a relatively bright ambient light environment, as shown by arrow 60, illumination optics 31 (FIG. 2) may illuminate spatial light modulator 33 with focused brightness in a region of the spatial light modulator that produces object 44 at location 46 (e.g., while processing step 58 of FIG. 4). This may boost the brightness of object 44 relative to the world light filling the remainder of image 40, so that object 44 remains visible to the user despite the high ambient light conditions.

Figure 6:
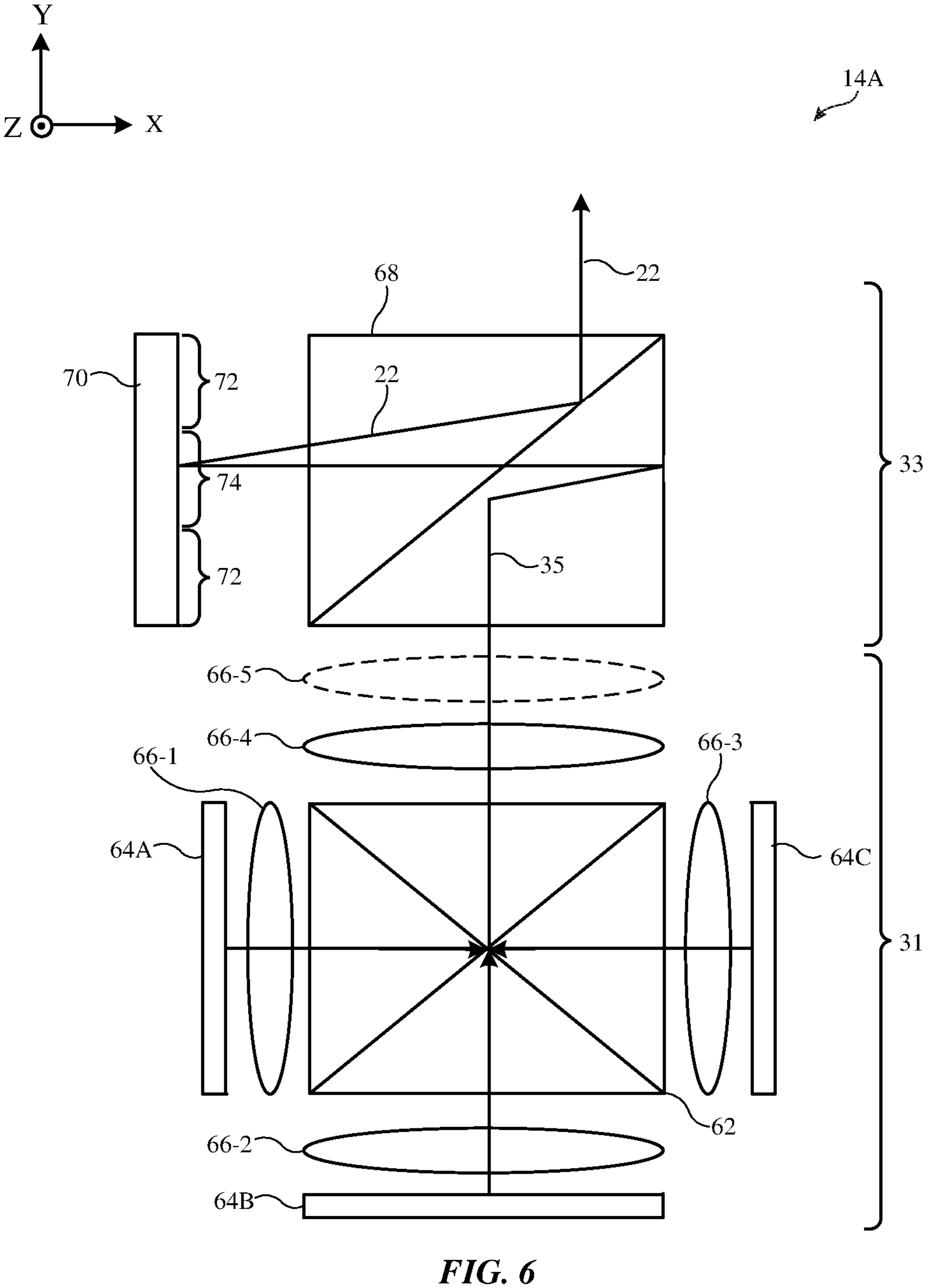
FIG. 6 is a top view of an illustrative display module having switchable optical elements for focusing illumination intensity on a portion of a reflective display panel in accordance with some embodiments.

Illumination optics 31 may include switchable (adjustable) optical elements that are controlled by control circuitry 16 to focus more illumination light onto particular regions of spatial light modulator 33 when needed (e.g., while processing step 58 of FIG. 4). FIG. 6 is a top view of display module 14A in an example where spatial light modulator 33 is a reflective spatial light modulator.

As shown in FIG. 6, illumination optics 31 may include light sources 64. Light sources 64 may include arrays of light sources such as a first array of light sources 64A, a second array of light sources 64B, and a third array of light sources 64C. Light sources 64 may include LEDs, OLEDs, uLEDs, lasers, etc. The arrays of light sources 64A, 64B, and 64C may each emit illumination light 35 of a corresponding wavelength range (e.g., color). For example, light sources 64A may emit red light, light sources 64B may emit green light, and light sources 64C may emit blue light. Prism 62 may combine the light emitted by light sources 64A, 64B, and 64C into illumination light 35 (e.g., illumination light 35 may include red, green, and blue light, etc.) and may provide illumination light 35 to spatial light modulator 33.

Spatial light modulator 33 may include prism 68 and a reflective display panel such as display panel 70. Display panel 70 may include a DMD panel, an LCOS panel, or other reflective display panel. Prism 68 may direct illumination light 22 to display panel 70 (e.g., different pixels on display panel 70). Control circuitry 16 controls display panel 70 to selectively reflect illumination light 35 at each pixel location to produce image light 22 (e.g., image light having an image as modulated onto the illumination light by display panel 70). Prism 68 may direct image light 22 to collimating optics 34 of FIG. 2.

As shown in FIG. 6, illumination optics 31 may include optical components 66 such as a first optical component 66-1 optically interposed between light sources 64A and prism 62, a second optical component 66-2 optically interposed between light sources 64B and prism 62, a third optical component 66-3 optically interposed between light sources 64C and prism 62, a fourth optical component 66-4 optically interposed between light sources prism 62 and spatial light modulator 33, and an optional fifth optical component 66-5 optically interposed between optical component 66-4 and spatial light modulator 33.

The example of FIG. 6 is merely illustrative. Illumination optics 31 may include any desired light sources 66 arranged in any desired manner for providing illumination light 35 of any desired wavelengths to spatial light modulator 33 through one or more optical components 66. Optical components 66 may include lenses (e.g., lenses having any desired number of lens elements with any desired shapes), polarizers, reflective elements, diffractive elements (e.g., diffractive grating structures such as holograms), prisms, etc.

One or more of optical components 66 may adjustable (switchable). The switchable optical component(s) may be adjusted (e.g., by control circuitry 16 in processing the steps of FIG. 4) between at least a first state at which illumination optics 31 provide illumination light 35 with a uniform intensity to the entire area of display panel 70 (e.g., within each of regions 72 and 74 of display panel 70 and while processing step 50 of FIG. 4) and a second state at which illumination optics 31 provide illumination light 35 with a non-uniform intensity across the area of display panel 70 (e.g., while processing step 58 of FIG. 4). For example, in the second state, the switchable optical component(s) 66 may provide illumination light 35 with a greater intensity (brightness) within region 74 than within regions 72 (e.g., by focusing illumination light 35 onto region 74 of display panel 70). Regions 74 and 72 may sometimes be referred to herein as portions 74 and 72 or areas 74 and 72 of display panel 70. The uniform intensity may, for example, vary by less than 10%, less than 5%, or less than 1% across the lateral area of display panel 70.

Region 74 may, for example, produce object 44 of FIG. 5 in image light 22 upon reflection of illumination light 35. There may be multiple (e.g., discontinuous) regions 74 on display panel 70 if desired (e.g., for images with multiple bright objects 44). Region 74 may, for example, be as large as 20-30% (e.g., 25%) of the width of display panel 70. The image light 22 produced by regions 72 may be dimmer in the second state than in the first state whereas the image light 22 produced by region 74 may be brighter in the second state than in the first state. This may allow the object in image light 22 produced by region 74 to remain visible to the user at eye box 24 even in bright ambient light conditions.

If desired, the switchable optical component(s) 66 may also be adjusted (e.g., by control circuitry 16 while processing step 58 of FIG. 4) to change the location of region 74 on display panel 70 (e.g., so that region 74 overlaps the bright object to be displayed in image light 22 regardless of the location of the object in the image). In other words, optical components 66 may be adjusted between a first state at which illumination light 35 is provided with uniform brightness across display panel 70 and one or more additional states at which illumination light 35 is provided with focused intensity within a corresponding region 74 (e.g., where each additional state corresponds to a different location for region 74 on display panel 70).

Any desired number of the optical components 66 in FIG. 6 may be the switchable optical components used to focus light on region 74 (e.g., to boost the local brightness of region 74). In one suitable arrangement, optical component 66-5 may be the switchable optical component whereas optical components 66-1 through 66-4 are fixed optical components (or switchable optical components not otherwise involved in focusing illumination light 35 on region 74). In another suitable arrangement, optical component 65-5 may be omitted, optical component 66-4 is the switchable optical component, and optical components 66-1 through 66-3 are fixed optical components. In yet another suitable arrangement, optical components 66-1 through 66-4 are the switchable optical components and optical component 66-5 is omitted. In another suitable arrangement, each of optical components 66-1 through 66-5 are the switchable optical components. In other arrangements, only optical component 66-1 is the switchable optical component, only optical component 66-2 is the switchable optical component, only optical component 66-3 is the switchable optical component, only optical components 66-1 and 66-2 are the switchable optical component, etc. The example of FIG. 6 is merely illustrative and, in scenarios where illumination optics 31 include other arrangements of light sources and optical components 66, any desired optical components 66 in illumination optics 31 may be the switchable optical components.

The switchable optical component(s) 66 may include, for example, switchable lenses having an adjustable focal length and/or power. Switchable lenses in optical component(s) 66 may, for example, include adjustable liquid lenses, adjustable liquid crystal lenses, etc. Control circuitry 16 may adjust the focal length and/or power of the switchable lenses to provide display panel 70 with uniform illumination intensity or with focused illumination intensity within one or more regions 74 at one or more locations on display panel 70.

In another example, the switchable optical component(s) 66 may include switchable diffractive grating structures. The switchable diffractive grating structures may, for example, include LC-based switchable diffractive gratings in which the diffracted light can be modulated by controlling an electric field applied to the holographic recording medium. In a first state, the diffractive gratings may transmit illumination light 35 without diffracting the illumination light or may diffract the illumination light 35 such that the illumination light is provided to display panel 70 with uniform brightness (e.g., while processing step 50 of FIG. 4). In a second state, control circuitry 16 may configure the diffractive gratings to diffract more illumination light 35 towards region 74 on display panel 70 than in regions 72 (e.g., to boost the local brightness of region 74).

Figure 7:
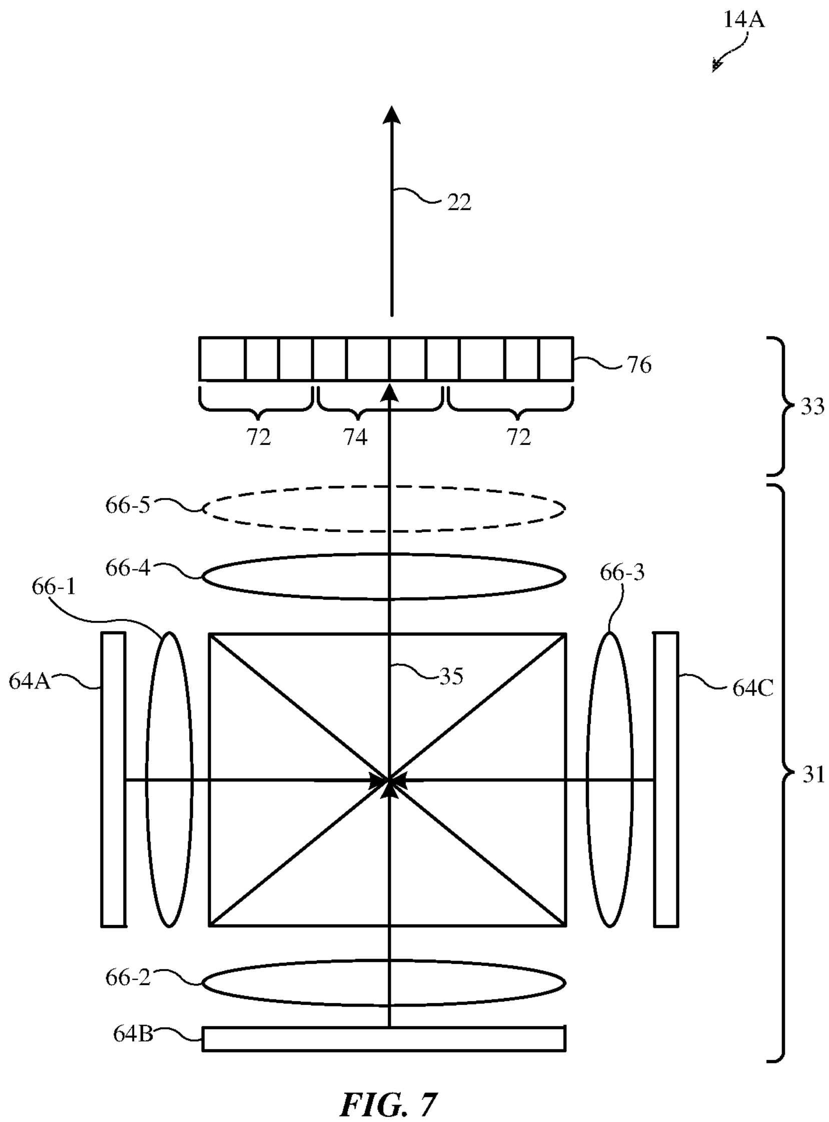
FIG. 7 is a top view of an illustrative display module having switchable optical elements for focusing illumination intensity on a portion of a transmissive display panel in accordance with some embodiments.

The example of FIG. 6 in which spatial light modulator 33 is a reflective spatial light modulator is merely illustrative. In another suitable arrangement, spatial light modulator 33 may be a transmissive spatial light modulator. FIG. 7 is a diagram showing how spatial light modulator 33 may be a transmissive spatial light modulator.

As shown in FIG. 7, spatial light modulator 33 may include a transmissive display panel such as display panel 76. Display panel 76 may, for example, be a liquid crystal display (LCD) panel. Control circuitry 16 may adjust the opacity of each pixel in display panel 76 to selectively transmit illumination light 35 as image light 22 (e.g., such that a corresponding image is modulated onto illumination light 35 in image light 22). As shown in FIG. 7, illumination optics 31 may provide illumination light 35 to display panel 76 with a uniform intensity (e.g., across regions 72 and 74) or with a focused (increased) intensity within one or more regions 74 and with a reduced (decreased) intensity within regions 72. This may ensure that the objects produced by region 74 in image light 22 remain visible to a user even in high ambient brightness conditions.

Figure 8:
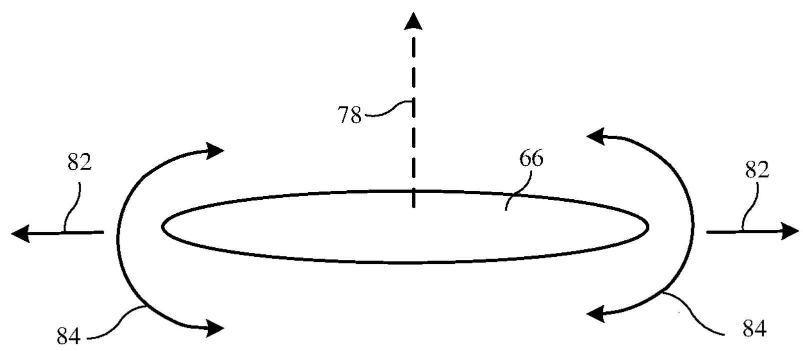
FIG. 8 is a diagram showing how a switchable optical element of the type shown in FIGS. 6 and 7 may include a lens that is rotated and/or translated to adjust where high intensity illumination is focused on a spatial light modulator in accordance with some embodiments.

If desired, control circuitry 16 may adjust the switchable optical component(s) 66 in illumination optics 31 to change the location and/or size of region 74 on display panels 70 or 76. FIG. 8 is a top view showing how control circuitry 16 may adjust the switchable optical component(s) 66 in illumination optics 31 to change the location and/or size of region 74 on display panels 70 or 76.

As shown in FIG. 8, switchable optical component 66 may have an optical axis 78. Control circuitry 16 may mechanically adjust the position and/or orientation of switchable optical component 66 (e.g., using a piezoelectric actuator, micro-electro-mechanical-systems (MEMS) components, or other mechanical adjustment components). For example, control circuitry 16 may adjust the lateral position of switchable optical component 66, as shown by arrows 82, and/or may adjust the orientation (tilt) of switchable optical component 66, as shown by arrows 84 (e.g., to adjust the angle and/or position of optical axis 78). This may configure switchable optical component 66 to focus illumination light within region 74 at different locations on display panels 70 or 76 (e.g., to provide objects in image light 22 with increased brightness even as the objects move in the image data over time).

Figure 9:
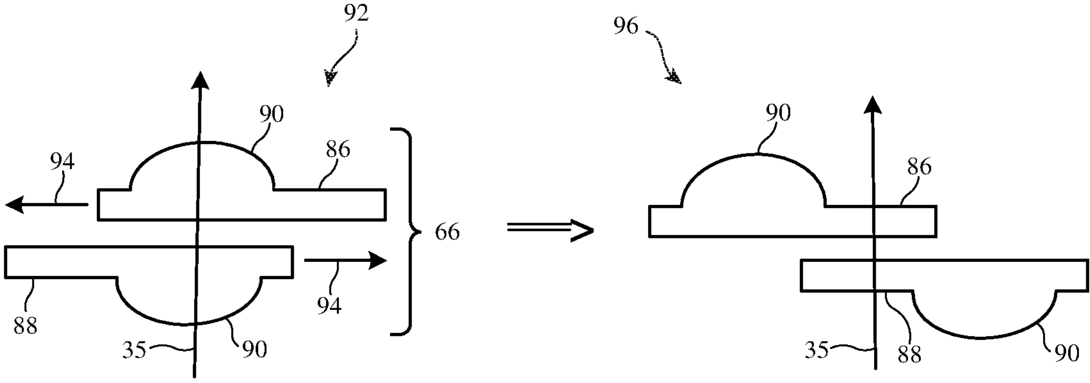
FIG. 9 is a diagram showing how a switchable optical element of the type shown in FIGS. 6 and 7 may include an Alvarez lens in accordance with some embodiments.

If desired, switchable optical component 66 may include an Alvarez lens. FIG. 9 is a diagram showing how switchable optical component 66 may be formed using an Alvarez lens. As shown in FIG. 9, switchable optical component 66 may include a first lens element 86 that overlaps a second lens element 88. Lens elements 86 and 88 may each have curved portions 90 and planar portions.

Switchable optical component 66 of FIG. 9 may be switchable between at least a first state 92 and a second state 96. In first state 92, curved portion 90 of lens element 86 may be aligned with curved portion 90 of lens element 88. Illumination light 35 may pass through the overlapping curved portions 90. Curved portions 90 may impart illumination light 35 with optical power (e.g., to focus illumination light 35 within region 74 of display panels 70 or 76).

Switchable optical component 66 may be placed in second state 96 by laterally moving lens elements 86 and 88, as shown by arrows 94. In second state 96, the planar portions of lens elements 86 and 88 may be overlapping. Illumination light 35 may pass through the planar portions of lens elements 86 and 88 without being imparted with optical power (e.g., to provide display panels 70 or 76 with uniform brightness). The example of FIG. 9 is merely illustrative and, in general, any desired switchable lens arrangements may be used for implementing switchable optical element(s) 66.

By dynamically controlling illumination optics 31 in this way, bright objects in image light 22 may remain visible at eye box 24 even in bright ambient light conditions. Adjusting optical components 66 in illumination optics 31 to focus illumination light onto region 74 may allow these operations to be performed without further increasing the size of illumination optics 31 or display module 14A and without increasing the overall power required by light sources 64.

In accordance with an embodiment, a display system is provided that includes a waveguide configured to form an optical combiner that combines real world light with image light, a spatial light modulator configured to produce the image light by modulating illumination light, and illumination optics configured to provide the illumination light to the spatial light modulator, the illumination optics are adjustable between at least first and second states, in the first state, the illumination optics are configured to provide the illumination light to the spatial light modulator with a uniform brightness across the spatial light modulator, and in the second state, the illumination optics are configured to provide the illumination light to the spatial light modulator with a non-uniform brightness across the spatial light modulator.

In accordance with another embodiment, in the second state, the illumination optics are configured to focus the illumination light within a region on the spatial light modulator, the region corresponding to an object in the image light.

In accordance with another embodiment, the illumination optics are controllable to adjust a location of the region on the spatial light modulator.

In accordance with another embodiment, the spatial light modulator includes a reflective display panel that is configured to produce the image light by reflecting and modulating the illumination light and the reflective display panel includes a panel selected from the group consisting of: a digital-micromirror-device (DMD) panel and a liquid crystal on silicon (LCOS) panel.

In accordance with another embodiment, the spatial light modulator includes a transmissive display panel that is configured to produce the image light by transmitting and modulating the illumination light.

In accordance with another embodiment, the transmissive display panel includes a liquid crystal display (LCD) panel.

In accordance with another embodiment, the illumination optics include a light source and an adjustable optical component, the light source is configured to emit the illumination light, and the adjustable optical component is configured to transmit the illumination light.

In accordance with another embodiment, the adjustable optical component includes a lens having an adjustable optical power, the lens has a first optical power when the illumination optics are in the first state, and the lens has a second optical power when the illumination optics are in the second state.

In accordance with another embodiment, the lens includes a liquid crystal lens.

In accordance with another embodiment, the lens includes an Alvarez lens.

In accordance with another embodiment, in the second state, the illumination optics are configured to focus the illumination light within a region on the spatial light modulator, and the lens is adjustable between a first orientation at which the region is at a first location on the spatial light modulator and a second orientation at which the region is at a second location on the spatial light modulator.

In accordance with another embodiment, the adjustable optical component includes a lens having an adjustable focal length, the lens has a first focal length when the illumination optics are in the first state, and the lens has a second focal length when the illumination optics are in the second state.

In accordance with another embodiment, the adjustable optical component includes switchable diffractive grating structures and, in the second state, the switchable diffractive grating structures are configured to focus the illumination light on a particular region of the spatial light modulator.

In accordance with another embodiment, the display system includes an adjustable tint layer that overlaps the waveguide and that transmits the real-world light towards the waveguide.

In accordance with an embodiment, an electronic device is provided that includes a light source configured to emit illumination light, a switchable optical component configured to transmit the illumination light, a spatial light modulator having a display panel configured to modulate the illumination light transmitted by the switchable optical component to produce image light, the display panel having a lateral area, an optical combiner configured to combine the image light with real-world light and configured to direct the image light towards an eye box, and control circuitry configured to control the switchable optical component to focus the illumination light on a subset of the lateral area of the display panel.

In accordance with another embodiment, the electronic device includes a light sensor configured to gather sensor data, the control circuitry is configured to control the switchable optical component to focus the illumination light on the subset of the lateral area based on the sensor data gathered by the light sensor.

In accordance with another embodiment, the control circuitry is configured to control the switchable optical component to provide the illumination light to the spatial light modulator with a uniform brightness across the lateral area when the sensor data indicates that an ambient brightness for the electronic device is less than a threshold brightness.

In accordance with an embodiment, an electronic device is provided that includes a light source that emits illumination light, a switchable optical component that transmits the illumination light and that is adjustable between at least first and second states, a display panel that modulates the illumination light transmitted by the switchable optical component to produce image light, the display panel has a lateral area, in the first state, the switchable optical component is configured to provide the illumination light to the display panel with a uniform intensity across the lateral area, in the second state, the switchable optical component is configured to provide the illumination to the display panel with a first intensity within a subset of the lateral area and with a second intensity outside of the subset of the lateral area, the first intensity is greater than the uniform intensity, and the second intensity is less than the uniform intensity, and an optical combiner that combines the image light produced by the display panel with real world light.

In accordance with another embodiment, the electronic device includes a prism that transmits the illumination light, the switchable optical component is optically interposed between the prism and the light source.

In accordance with another embodiment, the electronic device includes a prism that transmits the illumination light, the switchable optical component is optically interposed between the prism and the display panel.

The foregoing is merely illustrative and various modifications can be made to the described embodiments. The foregoing embodiments may be implemented individually or in any combination.

What is claimed is:

1. A display system comprising:

a waveguide configured to form an optical combiner that combines real world light with image light;

a spatial light modulator configured to produce the image light by modulating illumination light; and illumination optics configured to provide the illumination light to the spatial light modulator, wherein:

the illumination optics are adjustable between at least first and second states, in the first state, the illumination optics are configured to provide the illumination light to the spatial light modulator with a uniform brightness across the spatial light modulator, in the second state, the illumination optics are configured to provide the illumination light to the spatial light modulator with a non-uniform brightness across the spatial light modulator, the illumination optics comprise a lens configured to transmit the illumination light, the lens having an optical property, the optical property has a first value when the illumination optics are in the first state and has a second value when the illumination optics are in the second state, the optical property comprises an optical power or a focal length, and the illumination optics further comprise a light source configured to emit the illumination light, wherein, in the second state, the illumination optics are configured to focus the illumination light within a region on the spatial light modulator, and wherein the lens is adjustable between a first orientation at which the region is at a first location on the spatial light modulator and a second orientation at which the region is at a second location on the spatial light modulator.

2. The display system of claim 1 wherein the region corresponds to an object in the image light.

3. The display system of claim 2, wherein the illumination optics are controllable to adjust a location of the region on the spatial light modulator.

4. The display system of claim 1, wherein the spatial light modulator comprises a reflective display panel that is configured to produce the image light by reflecting and modulating the illumination light and wherein the reflective display panel comprises a panel selected from the group consisting of: a digital-micromirror-device (DMD) panel and a liquid crystal on silicon (LCOS) panel.

5. The display system of claim 1, wherein the spatial light modulator comprises a transmissive display panel that is configured to produce the image light by transmitting and modulating the illumination light, wherein the transmissive display panel comprises a liquid crystal display (LCD) panel.

6. The display system of claim 1, wherein the lens comprises a liquid crystal lens.

7. The display system of claim 1, wherein the lens comprises an Alvarez lens.

8. The display system of claim 1, further comprising an adjustable tint layer that overlaps the waveguide and that transmits the real-world light towards the waveguide.

9. The display system of claim 1, further comprising:

an input coupler configured to receive the image light from the spatial light modulator and configured to couple the image light into the waveguide, wherein the waveguide is configured to propagate the image light via total internal reflection, the illumination optics comprise a first light source configured to emit a first wavelength range of the illumination light, the illumination optics comprise a second light source configured to emit a second wavelength rage of the illumination light, and the first light source comprises a light source selected from the group consisting of: a light emitting diode, an organic light emitting diode, a micro light emitting diode, and a laser.

10. The display system of claim 1, further comprising control circuitry configured to place the illumination optics in the first state responsive to an ambient light level of the display system being below a threshold ambient light level.

11. The display system of claim 1, further comprising:

an input coupler configured to receive the image light from the spatial light modulator and configured to couple the image light into the waveguide, wherein the waveguide is configured to propagate the image light via total internal reflection.

12. The display system of claim 1, further comprising:

a diffractive grating on the waveguide and configured to couple the image light into the waveguide.

13. An electronic device comprising:

a light source configured to emit illumination light;

a switchable optical component configured to transmit the illumination light;

a spatial light modulator having a display panel configured to modulate the illumination light transmitted by the switchable optical component to produce image light, the display panel having a lateral area;

an optical combiner configured to combine the image light with real-world light;

control circuitry configured to control the switchable optical component to focus the illumination light on a subset of the lateral area of the display panel; and a light sensor configured to generate sensor data, wherein the control circuitry is configured to control the switchable optical component to provide the illumination light to the spatial light modulator with a uniform brightness across the lateral area when the sensor data indicates that an ambient brightness for the electronic device is less than a threshold.

14. The electronic device of claim 13, wherein the control circuitry is configured to control the switchable optical component to focus the illumination light on the subset of the lateral area based on the sensor data gathered by the light sensor.

15. An electronic device comprising:

a light source that emits illumination light;

a switchable optical component that transmits the illumination light and that is adjustable between at least first and second states;

a display panel that modulates the illumination light transmitted by the switchable optical component to produce image light, wherein:

the display panel has a lateral area, in the first state, the switchable optical component is configured to provide the illumination light to the display panel with a uniform intensity across the lateral area, in the second state, the switchable optical component is configured to provide the illumination to the display panel with a first intensity within a subset of the lateral area and with a second intensity outside of the subset of the lateral area, the first intensity is greater than the uniform intensity, and the second intensity is less than the uniform intensity;

a waveguide;

an input coupler configured to receive the image light from the display panel and configured to couple the image light into the waveguide, wherein the waveguide is configured to propagate the image light via total internal reflection after the image light has been coupled into the waveguide by the input coupler; and an output coupler configured to couple the image light out of the waveguide and towards an eye box.

16. The electronic device of claim 15, further comprising:

a prism that transmits the illumination light from the light source towards the display panel and that transmits the image light from the display panel towards the input coupler, wherein the switchable optical component is optically interposed between the prism and the light source.

17. The electronic device of claim 15, further comprising:

a prism that transmits the illumination light from the light source towards the display panel and that transmits the image light from the display panel towards the input coupler, wherein the switchable optical component is optically interposed between the prism and the display panel.

* * * * *